(12) United States Patent
Willis et al.

(10) Patent No.: US 8,814,363 B2
(45) Date of Patent: Aug. 26, 2014

(54) TRACKABLE PROJECTION SURFACES USING HIDDEN MARKER TRACKING

(71) Applicant: Disney Enterprises, Inc., Burbank, CA (US)

(72) Inventors: Karl D. D. Willis, Pittsburgh, PA (US); Takaaki Shiratori, Tokyo (JP)

(73) Assignee: Disney Enterprises, Inc., Burbank, CA (US)

( * ) Notice: Subject to any disclaimer, the term of this patent is extended or adjusted under 35 U.S.C. 154(b) by 118 days.

(21) Appl. No.: 13/661,366

(22) Filed: Oct. 26, 2012

(65) Prior Publication Data

US 2013/0050206 A1 Feb. 28, 2013

Related U.S. Application Data

(63) Continuation-in-part of application No. 13/083,054, filed on Apr. 8, 2011.

(60) Provisional application No. 61/322,098, filed on Apr. 8, 2010.

(51) Int. Cl.
*G03B 21/14* (2006.01)

(52) U.S. Cl.
USPC ............... 353/28; 353/39; 353/46; 353/121; 352/87 G; 352/3

(58) Field of Classification Search
CPC .. G06F 3/0346; H04N 9/3173; H04N 9/3185; H04N 9/3194; H04N 9/317; G09G 2340/04; G09G 2340/0407; G09G 2340/0421; G09G 2340/0442; G09G 2340/0464; G09G 2340/0471; G09G 2340/0478; G09G 2340/0492; G03B 21/124; G03B 21/145; G03B 21/147
USPC .......... 353/28, 39, 46, 121; 348/222.1, 231.7; 345/156; 352/87

See application file for complete search history.

(56) References Cited

U.S. PATENT DOCUMENTS

| | | | |
|---|---|---|---|
| 6,554,431 B1 * | 4/2003 | Binsted et al. | 353/28 |
| 7,775,883 B2 * | 8/2010 | Smoot et al. | 463/36 |
| 7,874,681 B2 * | 1/2011 | Huebner | 353/28 |
| 8,038,304 B2 * | 10/2011 | Mizuuchi et al. | 353/79 |
| 2008/0012824 A1 * | 1/2008 | Grunnet-Jepsen et al. | 345/156 |
| 2011/0248913 A1 * | 10/2011 | Willis et al. | 345/156 |
| 2013/0265502 A1 * | 10/2013 | Huebner | 348/789 |

* cited by examiner

*Primary Examiner* — William C Dowling
(74) *Attorney, Agent, or Firm* — Patterson + Sheridan, LLP

(57) ABSTRACT

Techniques for presenting display frames projected using a handheld projector. Embodiments detect a marker embedded in a display surface. A first display frame is projected onto the display surface from the handheld projector, where the first display frame projects, on the display surface, one or more animated objects positioned relative to the detected marker embedded in the display surface. Embodiments generate one or more subsequent display frames projected from the handheld projector, where at least a first one of the animated objects in the one or more subsequent display frames is positioned relative to the detected marker embedded in the display surface.

25 Claims, 13 Drawing Sheets

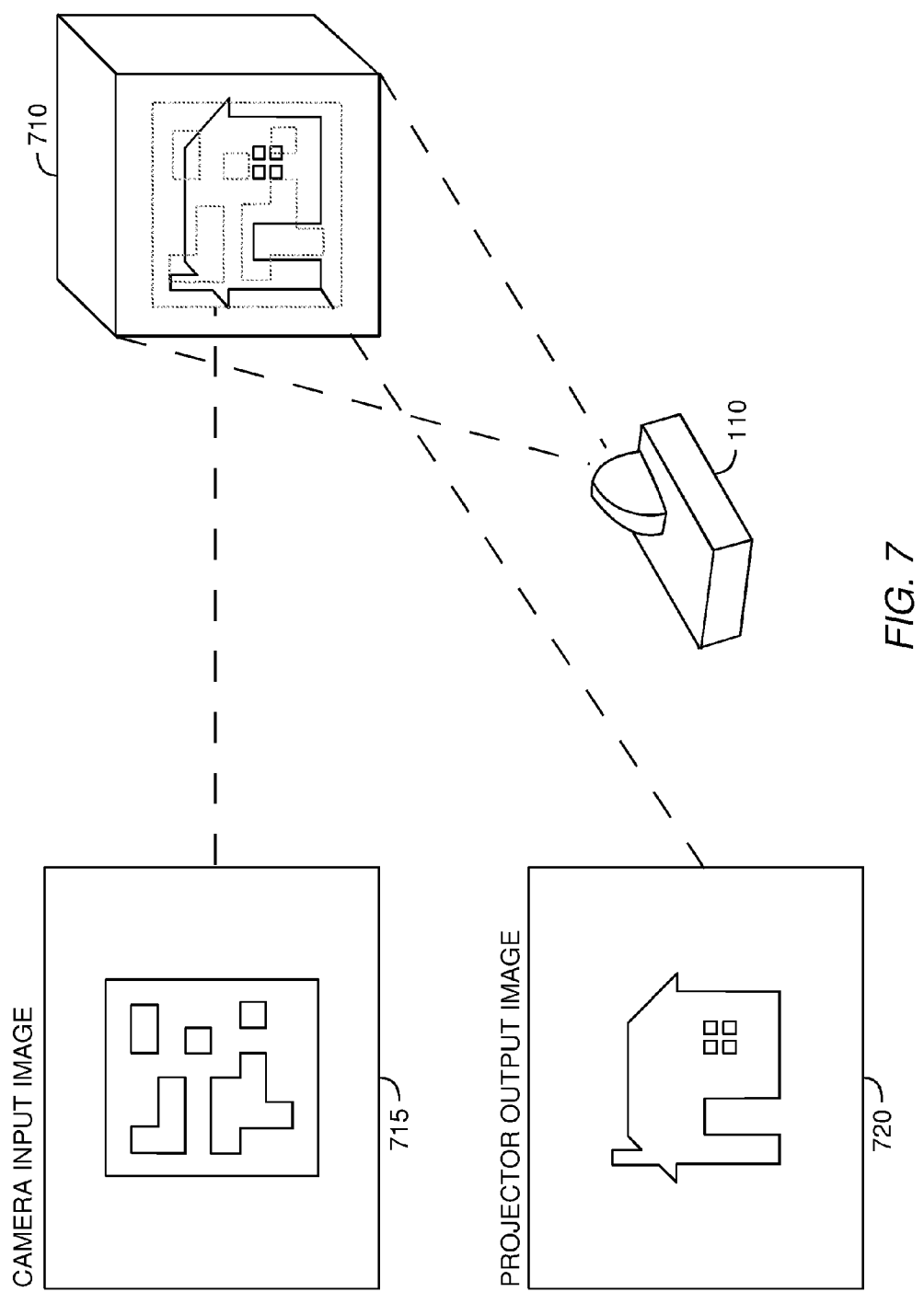

TRACKABLE PROJECTION SURFACES USING HIDDEN MARKER TRACKING

CROSS REFERENCE TO RELATED APPLICATIONS

This application is a continuation-in-part of U.S. patent application Ser. No. 13/083,054, filed Apr. 8, 2011, which in turn claims priority to U.S. Provisional Patent Application Ser. No. 61/322,098, filed Apr. 8, 2010, both of which are hereby incorporated by reference in their entirety.

BACKGROUND

1. Field of the Invention

Embodiments of the present invention relate to handheld projectors and, more particularly, to techniques for controlling objects in an image projected onto a surface from a handheld projector based on hidden markers within the surface.

2. Description of the Related Art

Over the last decade, image projection systems have been developed that are small enough to fit comfortably within a person's hand. Such handheld projectors (sometimes referred to as pocket projectors or mobile projectors or pico projectors) provide an image projector as a handheld device, and handheld projection systems can project images onto any nearby viewing surface, such as a wall.

Additionally, a handheld projector can be connected to (or integrated with) other portable devices such as mobile phones, personal digital assistants, and digital cameras. Handheld multimedia devices have evolved to provide sophisticated computing platforms, complete with large display areas, touch, sensitive surfaces and cameras, among other components. Further, the computing power of these devices has steadily increased; allowing sophisticated computing applications to be executed from the palm of one's hand. For example, handheld devices now frequently include computing hardware capable of rendering 3D graphics images in real time, and a variety of rendering applications are available for handheld devices. Handheld projectors can be connected to (or integrated with) these types of portable devices. When combined with (or connected to a computing system) a handheld projector can project any image generated by the computing system onto a viewing surface.

However, one of the major challenges when dealing with handheld projectors has been to develop interaction techniques that accommodate movement. Projected imagery moves, shakes, and distorts with every move of the user's hand, and a variety of approaches have been used to attempt to mitigate the effects of projector movement.

SUMMARY

Embodiments provide a method, handheld device and non-transitory computer-readable medium for presenting display frames projected using a handheld projector. The method, handheld device and non-transitory computer-readable medium include detecting a marker embedded in a display surface. Additionally, the method, handheld device and non-transitory computer-readable medium include projecting a first display frame from the handheld projector, wherein the first display frame projects, on the display surface, one or more animated objects positioned relative to the detected marker embedded in the display surface. The method, handheld device and non-transitory computer-readable medium also include generating one or more subsequent display frames projected from the handheld projector, wherein at least a first one of the animated objects in the one or more subsequent display frames is positioned relative to the detected marker embedded in the display surface.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the present disclosure may admit to other equally effective embodiments.

FIG. 7 illustrates an example of a mobile device that includes a handheld projection system projecting an image onto a surface having an embedded marker, according to one embodiment disclosed herein.

DETAILED DESCRIPTION OF EXEMPLARY EMBODIMENTS

Figure 1:
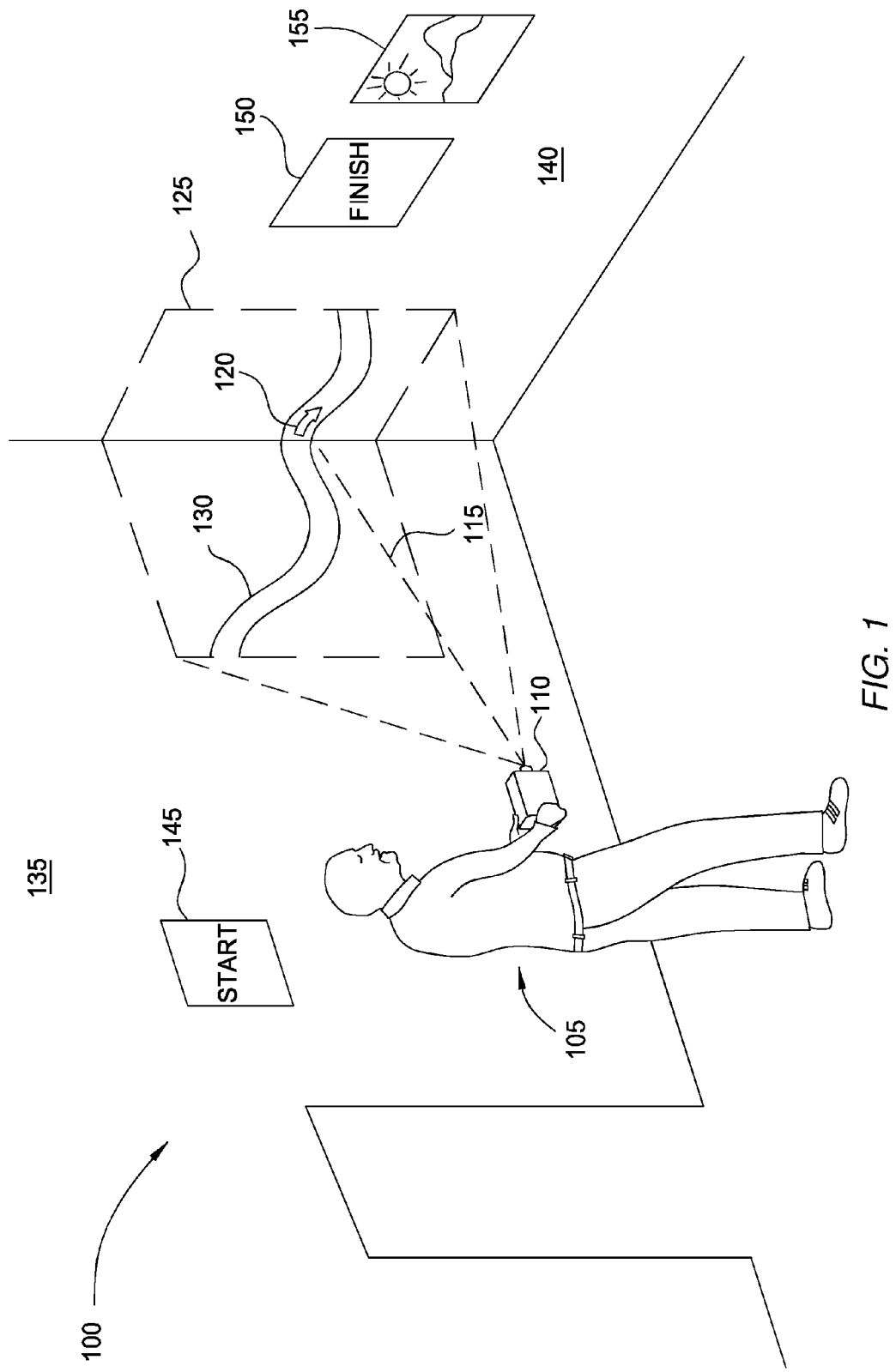
FIG. 1 illustrates an example of a user manipulating a mobile device that includes a handheld projector configured to respond to user movements and gestures, according to one embodiment disclosed herein.

Handheld projectors allow projected content to be situated side by side with physical objects in almost any space. The size of handheld projectors allows users to grasp them in a single hand, attach them to their bodies or move them from space to space. Some work has been done to mitigate or compensate for projector movement, e.g., to smooth jitter resulting from a user holding a handheld projector. However, rather than attempt to mitigate or compensate the effects of projector movement, embodiments encourage the use of handheld movement, using the projector itself as a gestural input device. Doing so allows virtual characters (or other projected objects) to blend into the physical world. Character interaction has applicability to a range of domains such as games, educational software, virtual worlds, storytelling and numerous other applications where an avatar is used to represent a user.

Additionally, in order to provide a more immersive interaction with their environment, handheld projects may use some way of identifying objects within the environment. For example, an infrared (IR) transmitter could be mounted to an object within the environment and an IR transceiver within the handheld projector could receive signals from the transmitter. The handheld projector could then determine a position within the environment at which the IR transmitter is located, based on the received signals, and may use this position to determine where to project frames from the handheld projector. The handheld projector could also determine which frames to display based on the signals received from the IR transmitter. Doing this allows the handheld projector to effectively distinguish between objects and surfaces in the physical environment based on IR transmitters attached to the objects and surfaces. However, such transmitter devices may be costly and may be prohibitively expensive for many applications. Additionally, such transmitters may be conspicuous when mounted to certain objects and thus may detract from the aesthetics and the immersiveness of the experience.

As such, embodiments provide techniques for presenting display frames projected using a handheld projector. Embodiments detect a marker embedded in a display surface. A first display frame is projected onto the display surface from the handheld projector, where the first display frame projects, on the display surface, one or more animated objects positioned relative to the detected marker embedded in the display surface. Embodiments generate one or more subsequent display frames projected from the handheld projector, where at least a first one of the animated objects in the one or more subsequent display frames is positioned relative to the detected marker embedded in the display surface and the position of the first animated object in the first display frame.

In one embodiment, characters projected using the handheld projector may be configured to respond and react to physical objects in the environment. For instance, embodiments could be configured to identify a particular physical object based on a marker embedded within the object (e.g., using an infrared ink) and could alter the characters in the projected frames based on the identified object. Further, elements of the physical environment may be configured to respond to the presence of the projected characters in a variety of ways.

In the following, reference is made to embodiments of the invention. However, the present disclosure is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Further, embodiments are generally described herein relative to a projection system integrated with a handheld computing device executing a program configured to respond to user movements and gestures. However, one of ordinary skill in the art will recognize that embodiments may be implemented in variety of ways. For example, the computing system need not be integrated with the handheld projector, but could communicate over wireless (or wired) communication networks. Additionally, embodiments are sometimes described relative to a "character" within a projection frame (which may or may not be an avatar under direct control of a user via the handheld projector). However, more generally, any projected object in the projection frame (e.g., projected symbols, shapes, images, vehicles, animals, etc.) can be controlled using the gestural input techniques described herein. Further still, such a projection frame may be used to generate two or three dimensional images.

FIG. 1 illustrates an example of a user 105 manipulating a mobile device 110 that includes a handheld projector configured to respond to user movements and gestures, according to one embodiment. In one embodiment, the movement of the mobile device 110 is used to both project display images (i.e., using the handheld projector) as well as provide an approach for controlling projected characters with user movements and gestures, merging virtual content with elements of the physical environment. The approach for user interaction involves the control of an object on the end of a metaphorical beam (sometimes referred to as a "motion beam"). The user controls one end of the beam and the object is linked to the opposite end. Moving the object up and down, or left and right is as simple as pointing the beam by sweeping the handheld projector in the desired direction.

Characteristics of the object can be changed dynamically based on how the user moves, gestures, and interacts with the motion beam. This may include dynamically changing a direction the object faces or changing the animated appearance of the object, e.g., by changing the direction, speed or behavior of an animated object or by changing the color, brightness, size of the object, etc. This could also include changing a viewing angle or perspective projection of the object, e.g., by customizing the animation as when a user translates the projection frame from one surface to another, such as from the face of one wall to another or from the face of one wall to a ceiling or floor. The animation of the object may also change when an object encounters other virtual and/or physical objects in the environment. The hands-on control of the object provided by the handheld projector creates an impression of a direct link between the handheld projector and the animated object. Further, physical movement and angling of the device may draw upon users' intuitive understanding of physics, e.g., by having animated objects conform to expectations of momentum and gravity.

Illustratively, the user 105 is generally standing within a room 100 and the handheld projector projects a display image 125 on a surface of wall 135 and wall 140. Further, within the display image 125, an arrow 120 is generally shown near the center of the display image 125. This example presents a simple game where the user navigates a path 130. As shown, the object 120 is generally configured to move in the direction pointed to by the arrow. Further, the user 105 may change what direction the arrow 120 is pointing to by rotating the handheld projector. The arrow itself remains in the center of the display image, as represented by a dashed line 115. Note, while rotating the handheld projector may change the direction (and movement) of the arrow, the handheld projector may generate display images that keep the path 130 in a relatively constant position. For example, an application program executing on the mobile device 110 (or on a computing system communicating with the device 110) may generate display images to animate the object moving through the path 130.

The mobile device 110 may include accelerometers (or other sensing devices) used to monitor the position, orientation, or other movement of the mobile device 110 or sense aspects of the display environment in which the mobile device 110 is being used. For example, in addition to accelerometers, the mobile device 110 could also include combinations of a magnetometer, a gyroscope and/or ultrasonic distance sensors. Further, the mobile device 110 could also include a camera and use video recognition software to analyze aspects of the display environment.

The mobile device 110 could also include components used to communicate or interact with the display environment. For example, the mobile device 110 could be configured with an infrared (IR) receiver configured to receive signals from IR transmitters or IR tags present at different points on the display environment. Such a signal could trigger changes in how the objects are animated (referred to as a virtual environment trigger) or changes in the physical environment (referred to as physical environment trigger). Such a signal could also be used as a fiducial marker used as a reference point (or points) within the display environment. Conversely the mobile device 110 could include an IR transmitter used to signal IR sensors in the display environment, allowing elements of the display environments to respond to the presence of a motion beam object when the handheld projector is pointed at one of the receivers. Other components that could be used include an optical laser or radio frequency ID tags (RFID tags), among others. Further still, the mobile device 110 could also include components used to connect to a data communications network (e.g., an 802.11 wireless network interface or a Bluetooth transceiver).

Additionally, the mobile device 110 could include an IR camera capable of detecting markers embedded within a surface using an infrared ink. Generally, an infrared ink refers to any ink that is perceptible to an infrared-sensing device (e.g., an infrared camera). Oftentimes, such infrared inks are also hidden (i.e., invisible or difficult to see) to the human eye, and thus can be embedded in a display surface without disturbing the appearance of the display surface to users of the mobile device 110. The mobile device 100 could then use these embedded markers as a reference point (or points) within the display environment. For example, a set of markers could be embedded within the page of a book using an infrared ink and the mobile device 110 could detect these embedded markers using an infrared camera. A handheld projector (e.g., a standalone unit, a projector coupled to the mobile device 110, etc.) could then project an animated character onto the page of the book at a positive relative to the position of the embedded marker, thereby animating the page of the book that the user is reading. By doing so, embodiments can use embedded markers that are hidden to the human eye to detect when the mobile device 110 is pointed at a particular object and to perform an appropriate predefined action corresponding to the particular object.

In the particular example of FIG. 1, assume that when the arrow 120 shown in display image 125 deviates from the path 130, then the user has to "start over" by moving the arrow 120 to be positioned over a decal 145 affixed to the surface of wall 135. In such a case, the mobile device 110 may be configured to determine when the arrow 120 is positioned at the decal 145. For example, the decal 145 may include an embedded IR marker used by the mobile device 110 to determine when the motion beam object (i.e., the arrow 120) is being projected onto the decal 145. For instance, the mobile device 110 could be configured with an IR camera capable of detecting the embedded IR marker within the decal 145. Once the user points the mobile device 110 at the decal 145, a game begins and as the user sweeps the mobile device 110 including the handheld projector from the decal 145 (on the left side of the room) towards a decal 150 (on the right side of the room), the arrow 120 moves in the pointed direction. In this example, assume that software running on the mobile device 110 (or on a system in communication with the mobile device 110) generates the path 130 that the user should follow to the end at decal 150 by rotating the mobile device 110. Further, assume that another embedded IR marker is present at a decal 150. In the event the end point is reached, the display image could stop animating the arrow 120. Advantageously, embodiments can accomplish this all while keeping the embedded IR markers within the decals 145 and 150 hidden from the view of the user 105.

Additionally, elements of the physical environment may be configured respond to the presence of the projected objects.

For example, a solenoid (or other mechanism) could be placed underneath a picture 155 hung on the wall 140 next to the decal 150. An IR transmitter could be connected to the solenoid and along with other components (e.g., a driver, electronics and power source). In such a case, the mobile device 110 could monitor how fast the user is navigating through the path 130 (i.e., sweeping the projector from left to right), and if the user successfully navigates the path 130 at a sufficient speed (configured as parameter of the game), then the mobile device 110 could transmit a signal received by an IR sensor integrated with the picture 155 which triggers the solenoid to knock the picture 155 off the wall. Doing so could effectively blend the virtual environment of the display image 125 and the physical environment of the room 100, making it appear as if the arrow 120 crashed into the picture 155, knocking it off the wall 140. This relatively simple example shows how the "motion beam" metaphor (represented by the dashed line 115) can be used with a hand-held projectors to physically control the environment surrounding the user.

Note, while shown being animated on generally flat surfaces (wall 135 and 140) objects could be animated and projected onto a variety of flat and dimensional physical objects such as things painted or attached to the wall, books, statutes, toys, windows, light sources, composited with animations projected by other display devices, etc.

Figure 2:
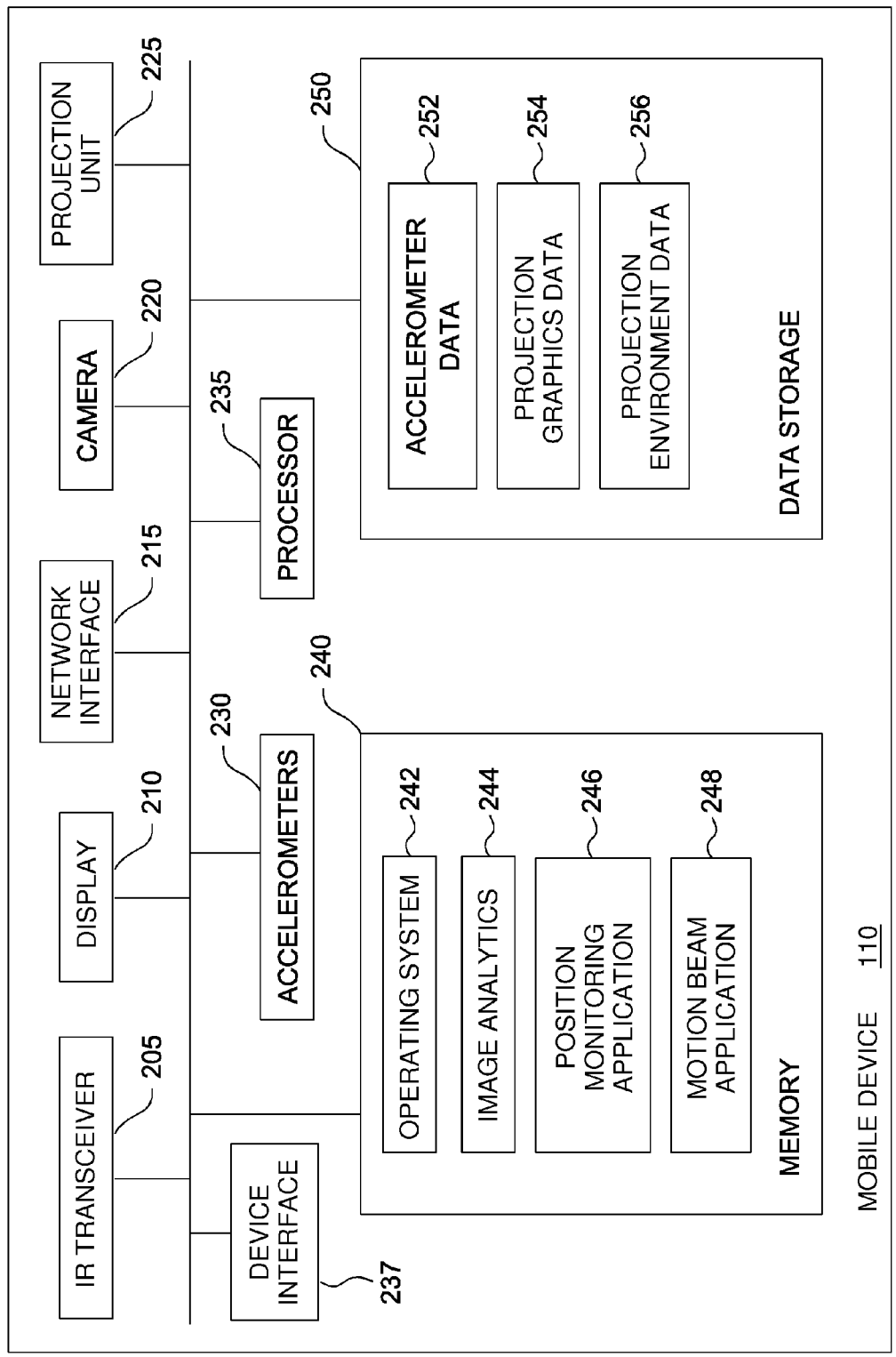
FIG. 2 illustrates an example of a mobile device that includes a handheld projector, according to one embodiment disclosed herein.

FIG. 2 illustrates an example of a mobile device 110 that includes a projection unit 225, according to one embodiment described herein. As shown, the mobile device 110 includes, without limitation, an IR transceiver 205, a display 210, a network interface 215, a camera 220, a projection unit 225, accelerometers 230, a processor 235, device interface 237, memory 240 and data storage 250. In addition, the mobile device 110 may also include a variety of sensing and/or signaling components, allowing mobile device 110 to monitor the environment and objects in the environment. For example, the mobile device 110 may include combinations of an IR receiver, a temperature monitor, a microphone, an ultrasonic range finder, a light sensor, a camera, a radio frequency (RF) monitor, a laser scanner, etc., as well as include signaling components used to communicate with devices in the environment such as an RF or Bluetooth transceiver, an IR transmitter, audio speakers, an RFID transmitter, etc., and components for projecting images (laser, projector with light modulator, etc.)

Generally, the processor 235 retrieves and executes programming instructions stored in the memory 240 and/or storage 250. Processor 235 is included to be representative of a single CPU, multiple CPUs, a single CPU having multiple processing cores, GPUs having multiple execution paths, and the like. Additionally, the memory 240 is included to be representative of a random access memory. Storage 250, such as a flash memory device, may store non-volatile data. The network interface 215 may allow the mobile device 110 to connect to data communications networks (e.g., wired Ethernet connection or an 802.11 wireless network). Note, although memory 240 and storage 250 are illustrated as separate components, a handheld or mobile computing device may use an integrated memory and storage architecture. Further, while illustrated using exemplary bus architecture to connect the components of mobile device 110, one of ordinary skill in the art will recognize that mobile computing devices may use a variety of different hardware architectures.

In the depicted embodiment, the mobile device 110 also includes a display 210 used to provide a user interface. For example, the display 210 may provide a touch sensitive surface allowing the user to select different application programs (e.g., to select what virtual environment to project using the projection unit 225). Alternatively or in addition, the device interface 237 may include a set of buttons, switches or other physical device mechanisms for controlling the mobile device 110. For example, the device interface 237 could include a set of directional buttons used to navigate a menu presented on display 210 (or projected by projection unit 225). In such a case, the menu could allow users to select an application program. Additionally, the user interface could allow users to select, purchase or otherwise obtain data used by the motion beam application 248 to download different application programs as well as different characters or graphics for a particular game. For example, a user could download different avatars, characters, costumes chapters, or environments for use by a given motion beam application.

The IR transceiver 205 allows the mobile device 110 to send and receive signals to/from the physical environment in which the mobile device 110 is being used. For example, as noted above, the mobile device 110 may receive a signal from an IR tag affixed to a wall when pointed at the tag. Similarly, the IR transceiver 205 may send signals to elements of the physical environment. Doing so may result in changes in the physical environment that appear to have been triggered by objects in the display image projected by projection unit 225. Of course, the mobile device 110 may use other light or wireless (e.g., optical, acoustic and/or RF) sensing apparatus to communicate with elements of the physical environment, e.g., laser scanned barcodes, or fiducial markers, or CCD camera lens. Similarly, RFID tags could be used or the mobile device 110 could communicate with other network-connected devices in the projection environment (using the network interface 215). Generally, embodiments make use of any available wired or wireless communication and sensing technology to discern information from the environment and to communicate with physical objects in the environment. Likewise, embodiments make use of any available actuation and user interface technology such as solenoids, actuators, lights, sound generators, scent generators, motors, fans, valves, sprays and the like to implement physical events in the environment.

Accelerometers 230 provide components that measure acceleration of the mobile device 110, i.e., acceleration of the mobile device 110 relative to freefall. In one embodiment, the accelerometers 210 may be used to monitor magnitude and/or direction of the acceleration of the mobile device 110 as a vector quantity at a specified rate, e.g., the accelerometers in some currently available handheld devices operate at rate of 100 Hz. Data from the accelerometers 230 may be stored as accelerometer data 252 and accessed by application programs on the mobile device 110 while projecting a virtual environment on a display surface. For instance, embodiments could use the accelerometers 230, in conjunction with the camera 220, to determine and monitor a position of the mobile device 110 within its physical environment. Embodiments could then use the determined position to alter the image projected from the projection unit 225. For example, a particular image could appear as skewed when projected onto the display surface from certain angles. In order to prevent this, embodiments could monitor the position of the mobile device 110 relative to the display surface and could adjust the projected image accordingly in order to maintain the original dimensions of the projected images.

Figure 3B:
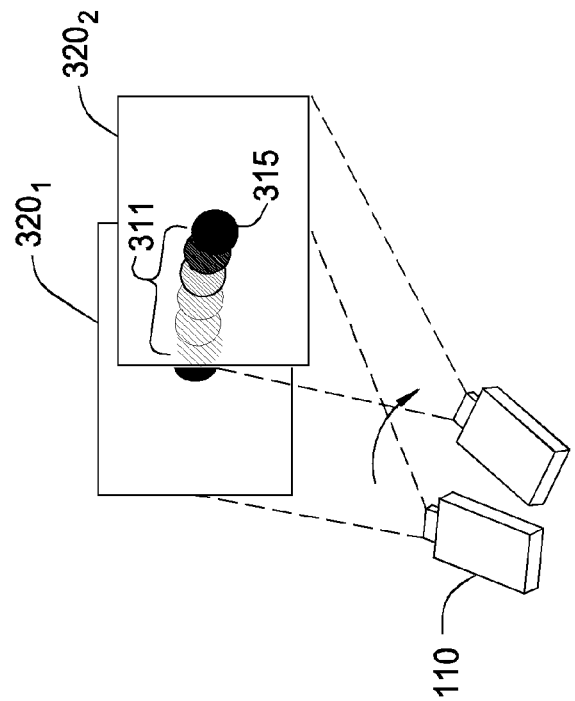
FIGS. 3A-3G illustrate a variety of user movements and gestures used to control objects projected using a mobile device that includes a handheld projection system, according to one embodiment disclosed herein.
Figure 3A:
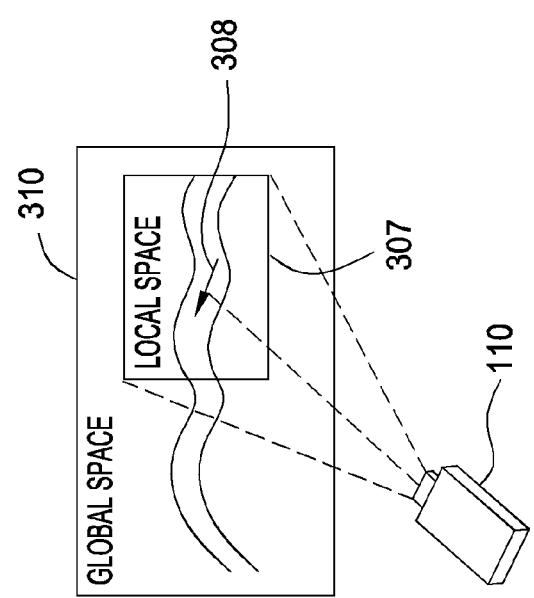

Illustratively, the memory 240 includes an operating system 242, an image analytics application 244, a position monitoring application 246, and a motion beam application 248. The operating system 242 generally controls the execution of application programs on the mobile device 110. The position monitoring application 246 may be configured to analyze the accelerometer data 252 (and/or other sensor data) to monitor relative changes in position of the mobile device 110. In turn, such information may be used by the motion beam application 248 to generate display images of objects or characters projected on the mobile device 110, where the objects or characters are controlled by user movements of the mobile device 110. FIGS. 3A-3B, discussed below, illustrate a variety of gestural inputs that may be used to control animated objects projected using the mobile device 110.

Projection graphics data 254 and environment data 256 represent the geometry of the objects, characters, and/or environment animated by the motion beam application 248 and projected using the projection unit 225. In one embodiment, the graphics data 254 and environment data 256 could be downloaded from an online source. For example, users could download graphics data representing, characters, character costumes, appearance, features or attributes, and virtual environments from an online store. The mobile device 110 may be configured to both receive graphics data from an online source over a network but also send payment and account data to an online source over the network. A network connection to an online system can use various security protocols and payment options to allow users to purchase additional content and software securely.

In addition to the graphics data representing the appearance of characters, objects and the virtual environment for a given application, users can also download data describing environmental behavior for a given motion beam application 248. For example, an application may include environmental triggers such as virtual environment triggers, where the virtual environment is changed when the motion beam object interacts with a trigger and physical environment triggers, where the physical environment is changed when the motion beam object interacts with a trigger.

The camera 220 may provide a CCD device configured to capture still-images and video stored in data storage 250. In addition to receiving information about the physical environment using IR transceiver 205 and data communication networks, the mobile device 110 may also use the camera 220 to learn about the physical environment. Similarly, the camera 220 can be used to recognize objects in the environment, and once recognized these objects can trigger a change in the projected image. For example, in one embodiment, the image analytics application 244 may be configured to analyze images captured using the camera 220, and update, change, or modify the virtual environment projected by the motion beam application 248. For example, as the user moves the display image across a surface, the video analytics application 244 may use the camera 220 to identity changes in surface angles and make perspective corrections to the projected image. Further, the motion beam object or character may be configured to respond to changes in the projection surface identified by the video analytics application 244.

Additionally, the camera 220 may provide an infrared camera capable of detecting markers embedded using an infrared absorbing and/or infrared emitting material. Generally, such embedded markers will be difficult to see using the human eye, but can be detected by a device configured to detect the infrared spectrum. Embodiments may use an infrared camera 220 to detect embedded markers within a display surface. The motion beam application 248 could then determine a type of object that the display surface corresponds to, based on which embedded marker is detected. For example, a first page of a book could be preconfigured with a first marker embedded using an infrared-absorbing material, and a second page of the book could be preconfigured with a second marker also embedded using an infrared-absorbing material. The motion beam application 248 could then determine which page of the book the mobile device 110 is pointed towards, based on which embedded marker (e.g., the first marker or the second marker) is currently being detected. The motion beam application 248 could then adjust the display frames projected using the projection unit 225 based on the determined page. For instance, when the mobile device 110 is pointed at the first page, the projection unit 225 could project frames depicting two animated characters carrying a pail of water up a hill, and when the mobile device 110 is pointed at the second page, the project unit 225 could project the two animated characters rolling down the hill. Doing so provides an interactive storytelling experience for users reading the book, and does so while using an inconspicuous marker embedded on the pages of the book (i.e., an infrared ink that is difficult to see with the human eye).

Additionally, the motion beam application 248 could use the embedded marker to orient the projected image and to maintain the intended dimensions of the projected image. That is, as discussed above, images projected from the projection unit 225 could appear as skewed when projected from certain angles. As such, the motion beam application 248 could determine whether the detected embedded marker appears as skewed (i.e., in the image taken using an infrared camera 220) and, if so, could determine that any image projected from the current angle would also appear as skewed. In response to such a determination, the motion beam application 248 could then alter projected image in order to offset the estimated amount of skew. Advantageously, doing so enables the mobile device 110 to maintain the original shape and dimensions of the projected image, regardless of the perspective at which the mobile device 110 is pointed at the display surface.

Of note, although the projection unit 225 is discussed throughout this document as projecting bitmap images, such a discussion is for illustrative purposes only. It is broadly contemplated that any compatible form of projection technology could be used with embodiments of the present invention. For example, the projection unit 225 could be a laser projection unit capable of depicting an animated laser image onto a surface. In such an embodiment, the motion beam application 248 could determine a laser animation to project onto a surface, based on an embedded marker within the surface. More generally, however, any projection unit consistent with the present disclosure and the functions described herein may be used.

FIGS. 3A-3G illustrate a variety of user movements and gestures used to control objects projected using a mobile device that includes a handheld projection system, according to one embodiment. The movements and gestures in FIGS. 3A-3G illustrate different approaches for user interaction that control an animated object using the "motion beam" metaphor, i.e., where the user controls one end of the beam at the handheld projector and the motion beam object is linked to the opposite end.

First turning to FIG. 3A, as shown, a mobile device 110 is shown projecting a local space 307 of a larger global space 310. The local space 307 is contained within the projection, and the global space 310 encompasses an overall larger projection environment. Physical movement of the mobile device 110 translates the entire local space 307 within the global space 310. That is, the portion of the global space 310 explicitly projected at any given moment changes as the user moves the mobile device 110. In this particular example, an arrow 308 remains relatively constant at the center of the local space 308, but can be navigated through the global space 310

(e.g., by changing the rotation of the mobile device 110 and sweeping the mobile device 110 up, down, left and right).

In one embodiment, a user may interact with the handheld projector to control menus, scroll lists on the projection image and perform user interface functions, e.g., to select motion beam software, characters, or other downloadable content from an online store. In such a case, in addition to animating specific projection frames the interface may respond to specific gestures. For example, a user may move the handheld projector to "draw" a circle around a desired item available for purchase (e.g., a particular animated character or costume for such a character). More generally, while the handheld projector projects the first sequence of display frames on a display surface and animates a motion beam object (or objects) the application could be configured to recognize predefined gestural inputs and respond by performing a predefined response corresponding to the gesturing input. In addition to the example of purchasing content, gestures could be used to reset or restart the motion beam program, select a new motion beam application, trigger physical environment triggers, or modify how the motion beam object is animated. As an example of the latter case, assume a user gestures by jerking the handheld projector sharply upward. In response the application could animate the motion beam object as though it had been thrown upward and then falling back to the "ground" where the user would regain control of the motion beam object.

FIG. 3B illustrates a mobile device 110 projecting an initial display image $320_1$ and projecting a second display image $320_2$, following the user translating the projector 312 from an initial position to a second position. In this example, the movement of the mobile device 110 is manifested in the animation of an animated object 315 (in this example a ball). Specifically, the physical movement of the mobile device 110 is accentuated in the display frames $320_{1-2}$ by animating a motion trail 311 left behind the animated object 315. In this case, multiple, fading, images of the animated object 315 result in a path of prior motion being animated as the user moves the mobile device 110 from the initial position to the second position. Other techniques may be used to stylize the animated object 315 in response to movements of the mobile device 110, e.g., zip ribbons showing a path traveled, or blurring akin to long exposure photography.

Figure 3D:
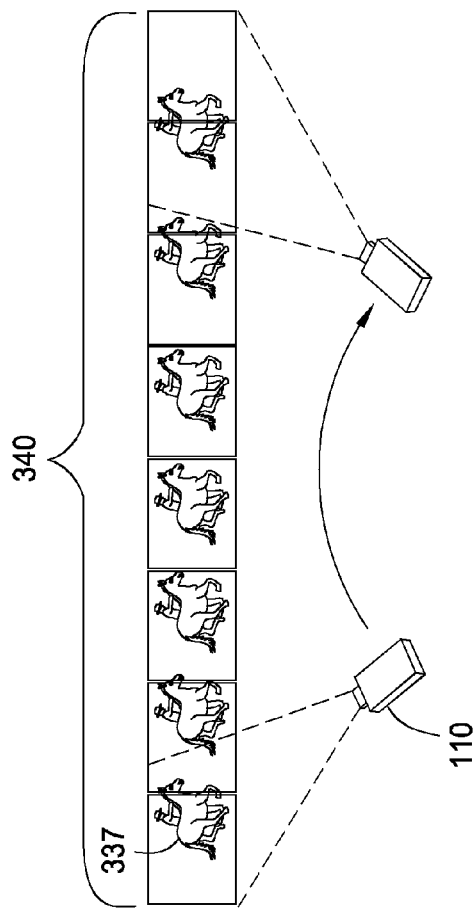
Figure 3C:
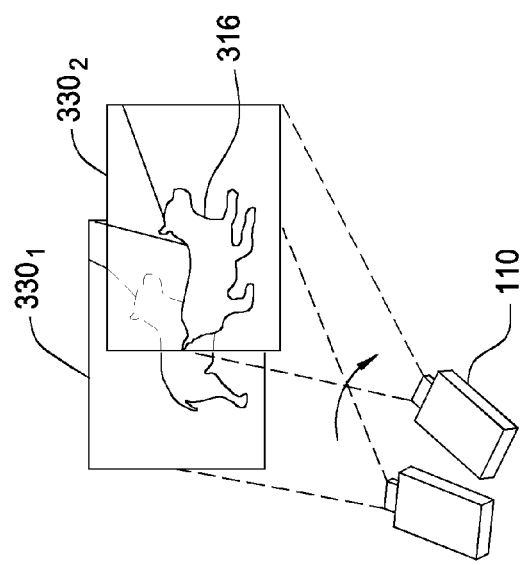

Similarly, FIG. 3C illustrates a mobile device 110 projecting an initial display image $330_1$ and mobile device 110 projecting a second display image $330_2$, following the user translating the projector 110 from an initial position to a second position. This example illustrates how physical properties of an animated object 316 (in this example, a dog on a leash) may be simulated based on user movement of the mobile device 110. Physics of the animated object 316 may be simulated in response to translations from a center of the local space made when the user moves the mobile device 110. For example, friction can be simulated in the virtual environment if the animated object 316 resists user movement and moves in the opposite direction—as shown by the dog resisting the movement of the mobile device 110 by "pulling" against the leash in display frame $330_2$. This results from the user translating the mobile device 110 from the initial position to the second position.

Similarly, the texture of a virtual or physical surface can be simulated by translating an animated object to depict a bumpy or smooth ride (e.g., as a car bouncing along a bumpy road). As another example, an animated can be influenced by simulated gravity. For example, an upward flick motion of the handheld projector could "throw" an animated object out of the local display space, only for the animated object to return back again seconds later.

FIG. 3D illustrates a mobile device 110 projecting a sequence of animation frames 340 as a user translates the projector 110 from an initial position to a second position. This example illustrates how a motion beam object may be animated in response to user movement of the handheld device 335. In this example an animated object 337 (specifically, a horse and rider) is animated in response to movement of the mobile device 110. More generally, changes in the position or orientation of the mobile device 110 may guide how the motion beam object is animated over time. Such an animation can be depicted in a number of ways including rotation, deformation, transformation, or color change Animations can be derived from movement of the motion beam object within the global space, interaction with virtual and physical objects, character behavior, and user gestures, etc. For example, the heading and speed of the mobile device 110 may be used to animate the motion beam object accordingly. For example, assume the user moves the mobile device 110 rapidly from right to left, in such a case, the animated object 337 (i.e., the horse and rider) could be animated galloping across the projection surface in the sequence of frames 340. Alternatively, if the user moves the mobile device 110 slowly from right to left, the animated object 337 could be animated to perform a trotting motion in the sequence of frames 340. As another example, objects can be animated to face the direction of movement in a 3D space. These approaches demonstrate to the user that the motion beam object is "aware" of the overall environment and responsive to user interaction.

Figure 3F:
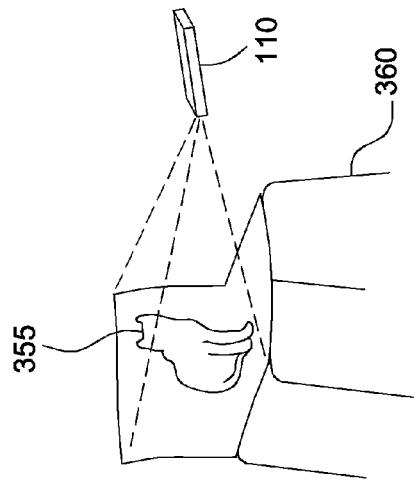
Figure 3E:
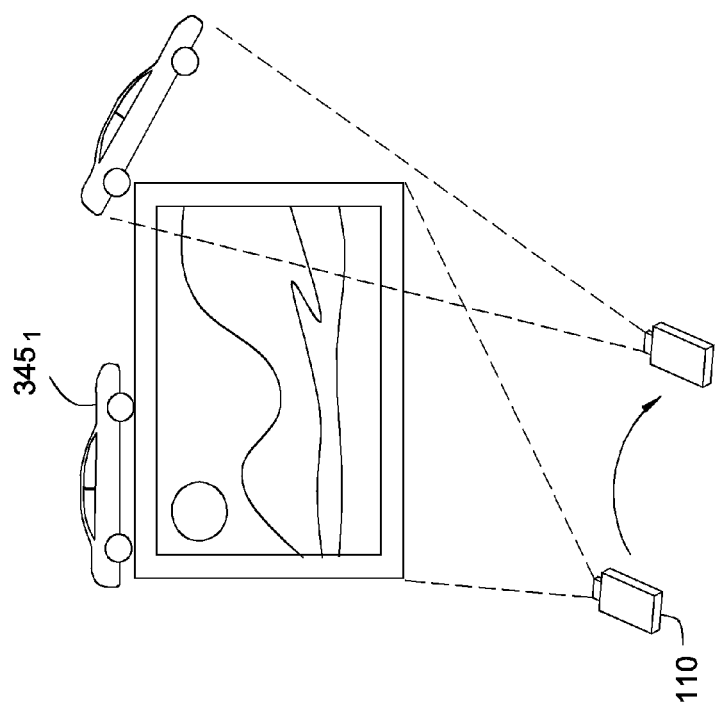

FIG. 3E illustrates a mobile device 110 projecting an initial display image $345_1$ and projecting a second display image $345_2$, following the user translating the projector 110 from an initial position to a second position. The Example of FIG. 3E shows how the animation of a motion beam object can interact with physical objects present in the display environment. In this particular example, the first display image $345_1$ shows a car supported by a picture frame 341. When the mobile device 110 is translated from right to left, the car could be animated to show the wheels turning creating the impression of the car being driven along the surface of the picture frame 341. Further, when the car moves sufficiently off the edge of the picture frame 341, the car could be animated to fall (as shown in display image $342_2$), creating the impression that the car has fallen off a cliff. More generally, depending on the desired interaction, a physical object can affect the motion beam object or the object can 'push back' and affect the physical object.

FIG. 3F shows an example of staging being used to situate an animated object 355 within the physical environment. As is known, in animation, the principle of staging refers to the process of focusing the attention of the audience by minimizing distractions in an animated frame. An important aspect of staging is the use of silhouette to highlight a main point of focus. In this example, staging is used to present the animated object 355 (a cat with a dark silhouette) sitting on a chair 360. Staging animated objects may be a useful for handheld projectors that have limited image brightness and contrast. In such cases, a strong silhouette may remain visible in conditions of high ambient light. Further, as with the other examples a staged motion beam object can be animated in response to movements of the mobile device 110. For example, the animated object 355 (i.e., the cat) could be animated to jump from the chair 360 when the user translates the mobile device 110 from being pointed at the chair 360 to other positions left or right of the chair 360 or animated to appear to climb the back of the chair 360 when the user translates the mobile device 110 in an upward motion.

Figure 3G:
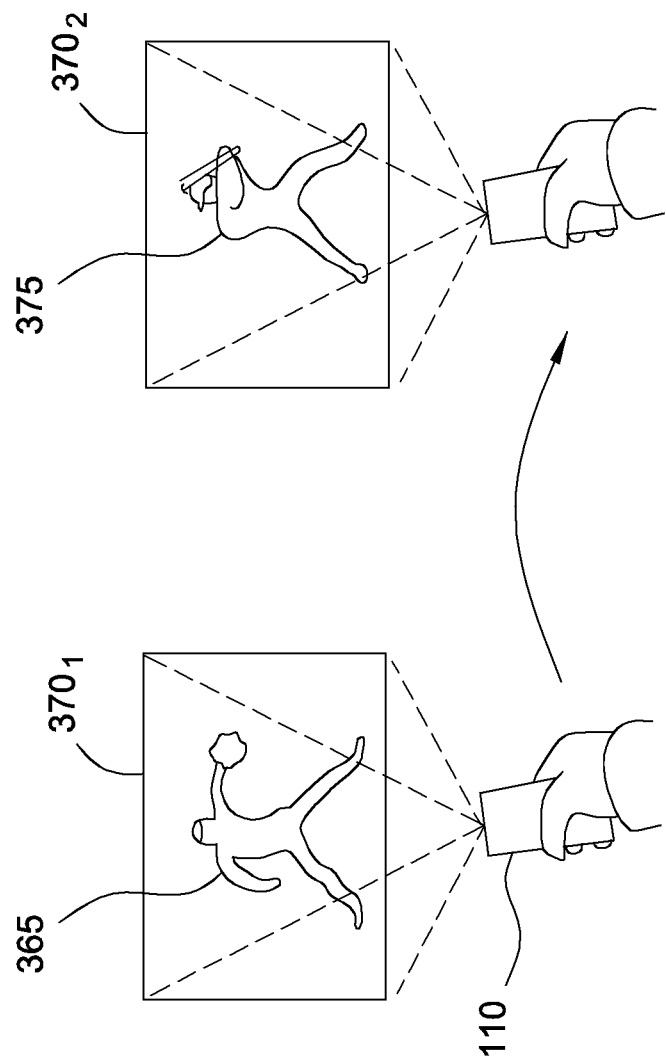

FIG. 3G shows an example of "closure" being used to convey the relationship between actions performed in projection frames 370₁ and 370₂ depicting different portions of a global space. The term closure is generally used in sequential art to infer meaning from a sequence of image panels. By viewing one panel followed by another a single meaning emerges. For example, a panel of a shooting gun beside another of a speeding ambulance infers that someone has been shot. The example shown in FIG. 3G illustrates the concept of "closure" being applied to a motion beam object over multiple projection frames. This approach may be used to reveal elements of an overall larger scene, where actions are shown sequentially in each frame to infer an overall meaning.

As shown, a mobile device 110 is projecting a display frame 370₁ depicting a baseball pitcher 365 and a display frame 370₂ depicting a baseball batter 375. While the user translates the mobile device 110 from left to right, the pitcher 365 could be animated to pitch a ball to the batter. Further, the intermediate display frames could animate a ball moving from left to right, and the batter 375 could be animated to swing at the pitch once the ball reaches the batter 375. While the baseball may not have followed a perfect path or transitioned with perfect timing (depending on how the user moves the mobile device 110), closure results in users perceiving the interaction as being part of the same scene.

Figure 4:
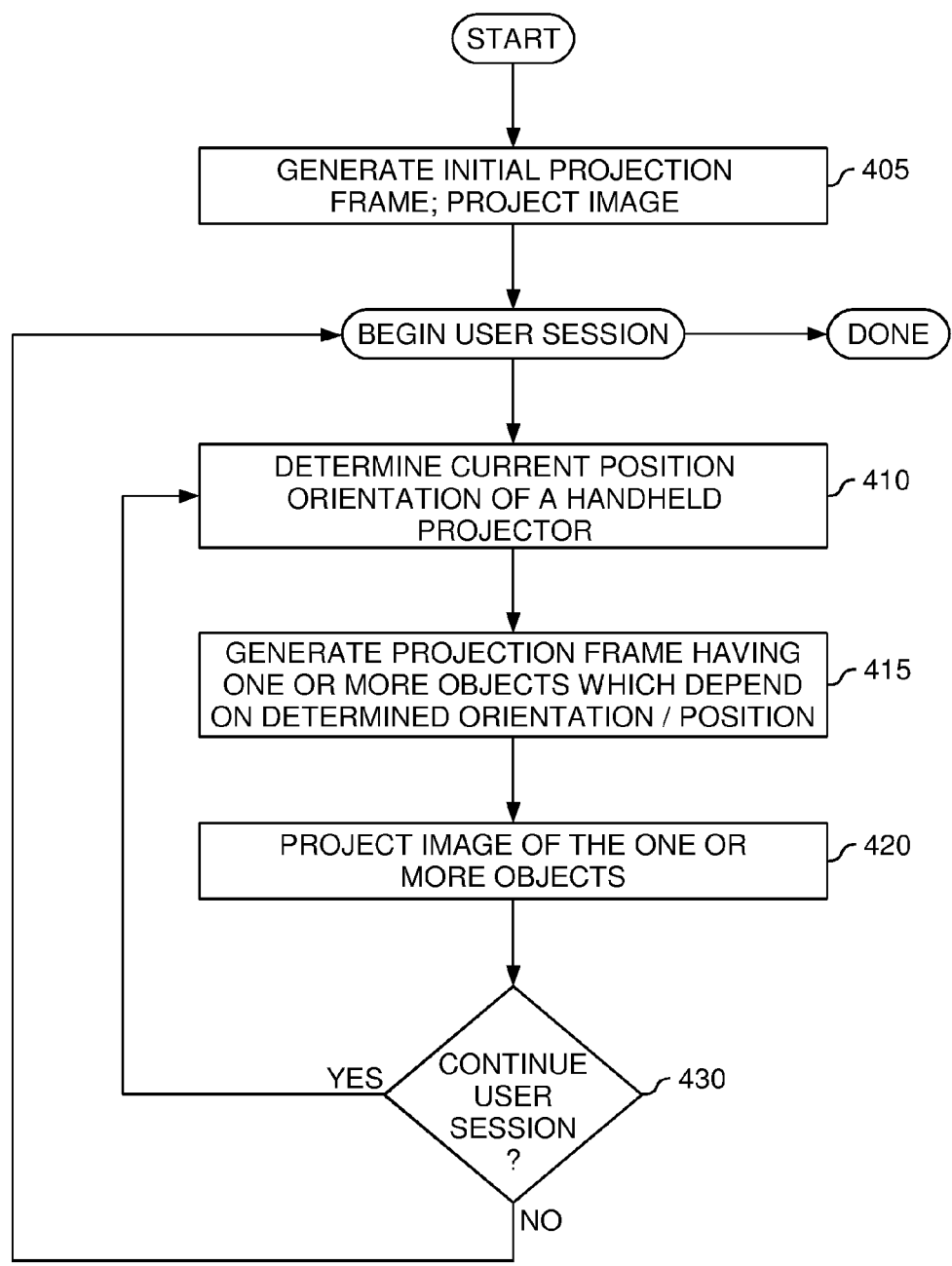
FIG. 4 illustrates a method for controlling objects projected using a mobile device that includes a handheld projection system, according to one embodiment disclosed herein.

FIG. 4 illustrates a method 400 for a mobile device that includes a handheld projection system, according to one embodiment. As shown, the method 400 begins at block 405 where a user executes a given motion beam application. As described above, the motion beam application may be configured to project a virtual environment, along with one or more motion beam objects on a display surface. Once the application begins executing, an initial display image is generated and projected using a handheld projector.

Following block 405, a loop begins where subsequent display frames are generated, which depend, at least in part, on the movement of the handheld projector. At block 410, a current position or orientation of a handheld projector is determined. For example, as noted above, the handheld projector may use accelerometers, magnetometers, gyroscopes, ultrasonic distance sensors, camera based video analytics and the like may to monitor movements/gestures made by the user holding handheld projector. At block 415, a projection frame may be generated which includes one or more objects or characters with visual characteristics that depend on the determined orientation/position of the handheld projector. Once generated, the frame, with the motion beam objects, is projected by the handheld projector. At block 430, the method returns to block 410 to generate the next projection frame, until the user ends the current user session.

Figure 5:
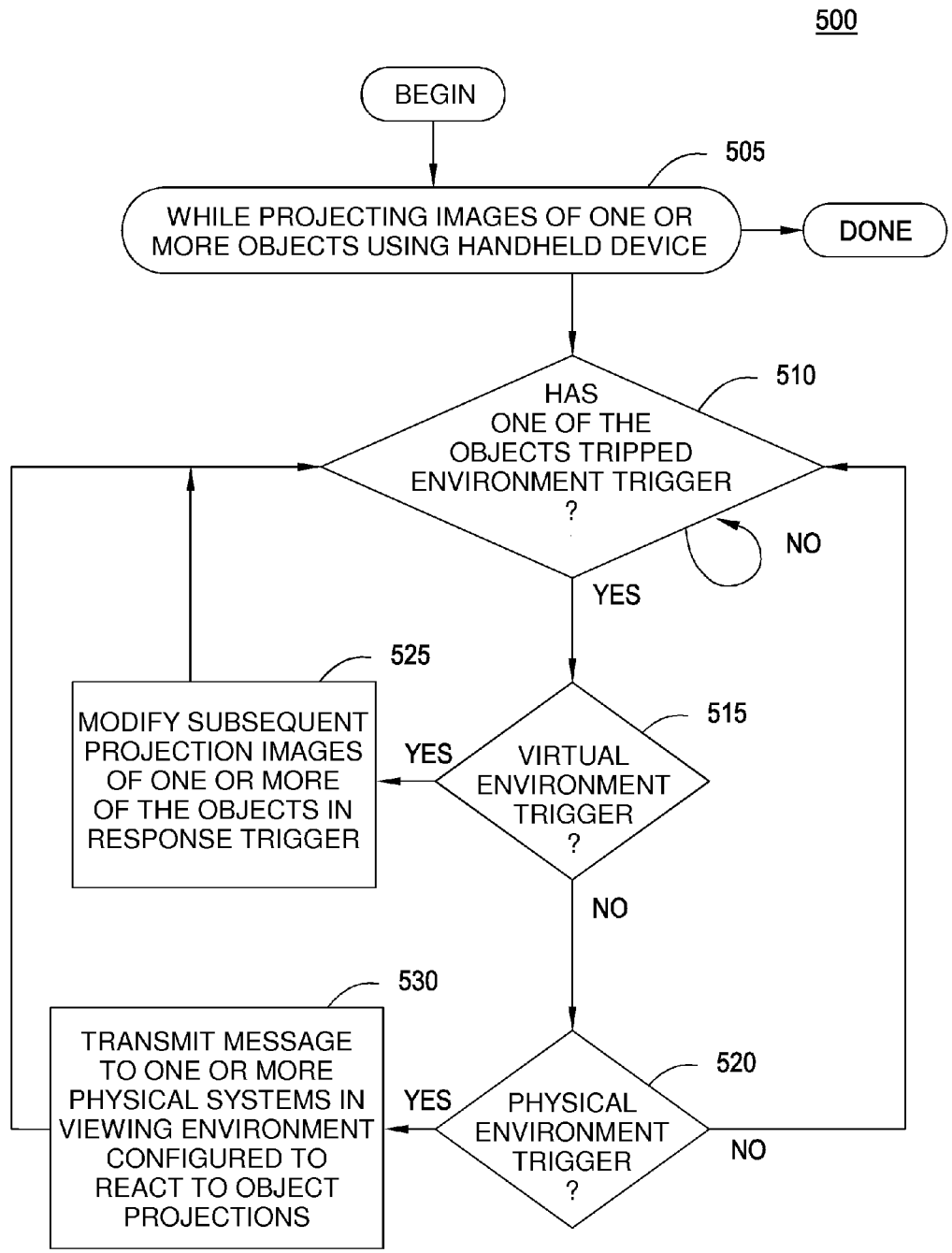
FIG. 5 illustrates a method for a mobile device that includes a handheld projection system configured to respond to environmental triggers, according to one embodiment disclosed herein.

As noted above, in addition to responding to the movement of the handheld projector, a motion beam object can respond to the physical projection environment. And conversely, the physical projection environment can respond to the motion beam object. FIG. 5 illustrates a method 500 for a mobile device that includes a handheld projection system to respond to environmental triggers, according to one embodiment. As shown, the method 500 begins at block 505 during a user session where one or more motion beam objects are displayed using a handheld projector, where user movements of the handheld projector control the objects.

At block 510, the handheld projection system determines whether one of the motion beam objects has tripped an environmental trigger. If not, the projection system continues to monitor the user interacting with the handheld projector until an environment trigger is tripped. Once such a trigger is tripped, the system determines whether a virtual environment trigger was tripped (block 515) or a physical environment trigger was tripped (at block 520).

In the event of a virtual environment trigger, elements of the virtual environment (or of the animated motion beam object) are modified in subsequent display frames projected from the handheld projector (block 525). For example, FIG. 6A shows an example of a motion beam object animated in response to tripping a virtual environmental trigger, according to one embodiment. As shown in projection frame 605, an animated object 610 (in this example a cat character) is projected near an IR tag 615. Note, the projection frame 605 includes the cat character, but the IR tag 615 is attached to a projection surface. That is, the IR tag 615 (in this case a decal with the appearance of a small trampoline) is not part of the display frame projected by a mobile device 110, but is instead part of the physical environment.

As the user translates the mobile device 110, the cat character may be animated to appear to be walking back and forth. However, the mobile device 110 may detect when the cat character is "standing" on the trampoline, i.e., when the projection image places the animated object 610 directly over the trampoline decal (i.e., over IR Tag 615. For example, the IR tag 615 may be configured to transmit a directional IR signal received when the mobile device 110 is pointed directly at the IR tag 615. In response, the motion beam application 248 may modify the animation of the animated object 610. For example, frame 620 shows animated object 610' (i.e., the cat character) animated to appear as though it were jumping on the trampoline present in the physical display environment. Once the user moves the cat character away from the IR tag 615, the animation of the animated object may return to the cat walking back and forth.

Returning to the method 500 of FIG. 5, in the event of a physical environment trigger, elements of the physical environment are modified as subsequent display frames are projected from the handheld projector (block 530). For example, FIG. 6B shows an example of a motion beam object 655 animated in response to tripping a physical environmental trigger, according to one embodiment. In frame 650, a car object is shown using the top of a first picture frame 665 as a surface. As the user moves the handheld projector, the car object may be animated to appear to jump from picture frame 665 to a second picture frame 660. Further, the second picture frame 660 may include a physical environmental trigger attached to a solenoid (or other actuating mechanism). In such a case, when the car "lands" on the second picture frame 660, the environmental trigger is tripped when a signal from an IR tag is received by an IR transceiver on the handheld projector. The result is shown in display frame 670, where, the solenoid is activated causing the second picture frame 660' to fall off of the wall. Further, the animation of the car 655' can be animated to appear to fall out of the frame 670 as its support surface (the second picture frame) is gone.

As another example, in one embodiment, a first handheld projector may be configured to respond to the presence of second handheld projector. In such a case, motion beam objects projected by the first and second handheld projectors could interact with one another in a variety of ways. For example, the solenoid attached to the second picture frame 660 could be configured to activate only when motion beam objects from two different handheld projectors encounter the physical environmental trigger (either in combination, giving the impression of "overweighting" the picture frame or in sequence, given the impression of "wearing out" the picture frame). Similarly, the motion beam objects could themselves react to each other's presence. For example, one motion beam object (say a cat) could be "frightened" by the presence of another motion beam object (say a dog). In such a case, the cat could be configured to "run" away from the dog when in close proximity to one another. A variety of object-to-object and object-to-environment interaction scenarios could be tailored to suit the needs of a particular case.

Projection Using Hidden Marker Tracking

As discussed above, in one embodiment, the mobile device 110 is configured to present display frames projected using a handheld projector. For instance, the mobile device 110 could detect a marker embedded in a display surface using an infrared camera 220. The projection unit 225 could project a first display frame onto the display surface, where the first display frame projects, on the display surface, one or more animated objects positioned relative to the detected marker embedded in the display surface. Additionally, the projection unit 225 could project one or more subsequent display frames onto the display surface, where at least a first one of the animated objects in the one or more subsequent display frames is positioned relative to the detected marker embedded in the display surface and the position of the first animated object in the first display frame.

Figure 6:
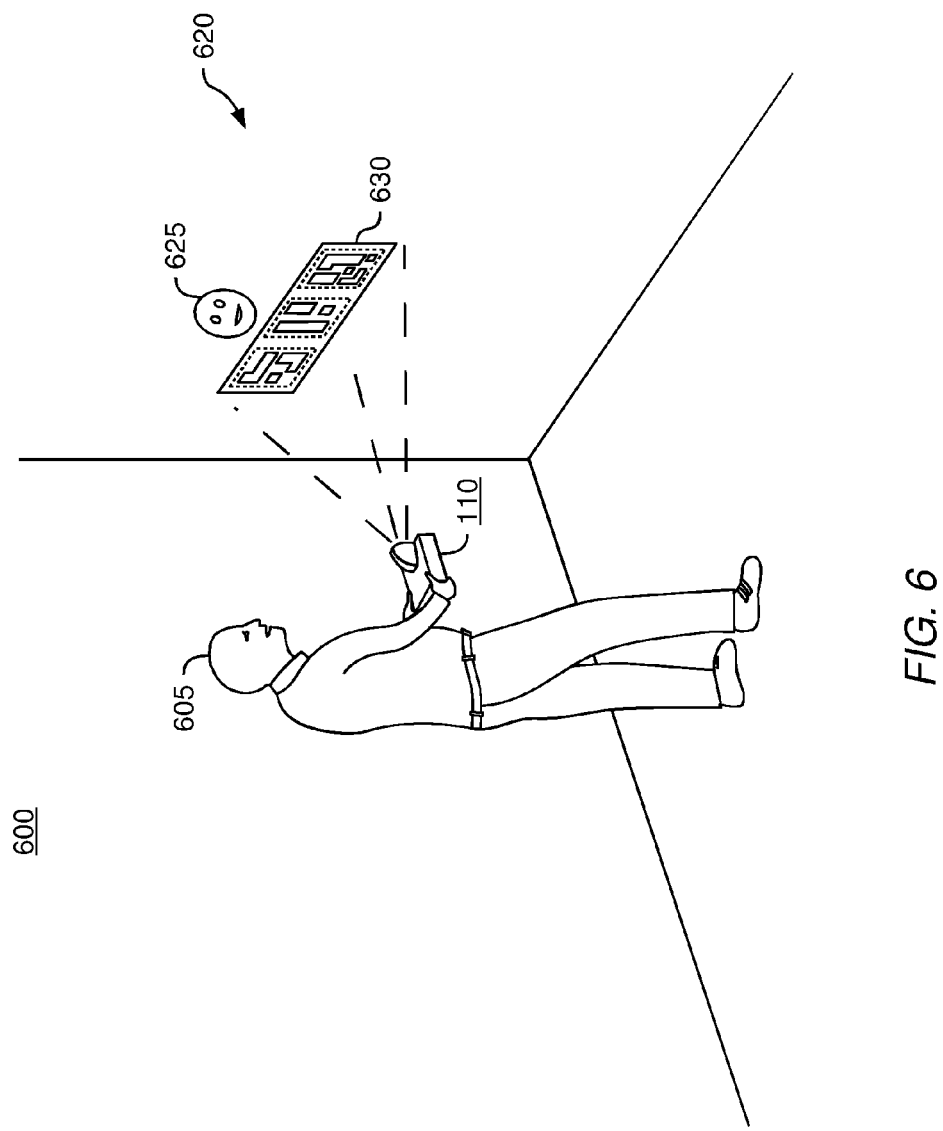
FIG. 6 illustrates an example of a user manipulating a mobile device that includes a handheld projection system configured to project onto a surface that includes an embedded marker, according to one embodiment disclosed herein.

An example of this is shown in FIG. 6, which illustrates an example of a user manipulating a mobile device that includes a handheld projection system configured to project onto a surface that includes an embedded marker, according to one embodiment disclosed herein. Here, the depicted scene 600 depicts a user 605 operating the mobile device 110 configured with a handheld projector. Additionally, the scene 600 includes a display surface 620 that includes embedded markers 630. As discussed above, the markers 630 could be embedded in the surface 620 using an infrared ink, such that markers 630 are difficult to see with the human eye but can be detected using an infrared camera. As shown, the mobile device 110 is projecting an image 625 onto the display surface 620 at a position based on the detected embedded markers 630.

Additionally, the motion beam application 248 could determine the frames to project based on the detected markers. For instance, the motion beam application 248 could detect the embedded markers 630 (e.g., using an infrared camera 220) and could determine a type of the display surface based on which markers are detected. That is, the motion beam application 248 could be preconfigured to recognize a plurality of unique markers, and each unique marker could correspond to a particular type of object. Thus, depending on which unique marker is detected, the motion beam application 248 could determine that the mobile device 110 is currently being pointed towards the corresponding type of object.

In a particular embodiment, the embedded markers may be designed in such a way that when the embedded markers overlap with a projected image on the display surface, the projected image helps to hide the embedded marker from being visible to the human eye. FIG. 7 illustrates an example of a mobile device that includes a handheld projection system projecting an image onto a surface having an embedded marker, according to one embodiment disclosed herein. As shown, the depicted scene includes a display surface 710 which includes an embedded marker 715, and a mobile device 110 projecting an output image 720 onto the display surface 710. In this example, the embedded marker 715 has approximately the same dimensions as the projected output image 720 and has been designed in such a way that the projected image 720 helps to hide the embedded marker 715 from being seen with human eye.

In a particular embodiment, the motion beam application 248 could be preconfigured to recognize particular embedded markers within a display surface and further configured with information relating to the physical dimensions of the embedded markers. For example, the motion beam application 248 could be configured with information specifying that the dimensions of the embedded marker 715 are 15 cm by 15 cm. The motion beam application 248 could then use the dimensions information to determine an estimated distance between the mobile device 110 and the display surface 710, based on the size of the embedded marker within an image captured by an infrared camera of the mobile device 110. The motion beam application 248 could then use the estimated distance to adjust the size of the projected image 720, such that the projected image 720 will remain the same size regardless of the distance between the mobile device 110 and the display surface 710. Additionally, the motion beam application 248 could use the dimensions information to determine whether the embedded marker appears as skewed within the image captured by the infrared camera, and if so, could determine that a projected image from the current position of the mobile device 110 would also appear as skewed. Accordingly, the motion beam application 248 could adjust the project image in order to offset the predicted amount of skew. Advantageously, doing so enables the mobile device 110 to project the same image regardless of the position of the mobile device.

Figure 8A:
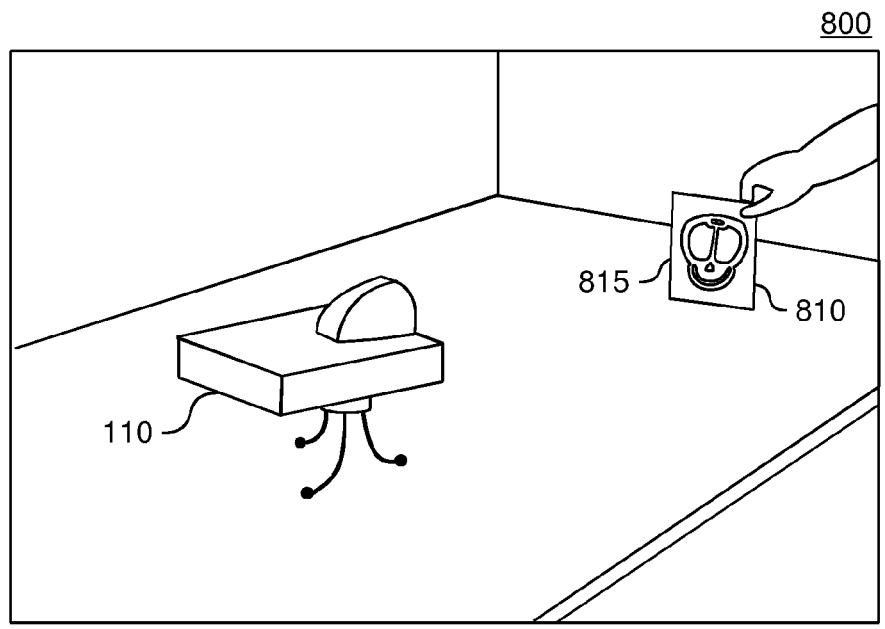
FIGS. 8A-B illustrate an example of projecting slices of a three-dimensional image from a mobile device that includes a handheld projection system, according to one embodiment disclosed herein.
Figure 8B:
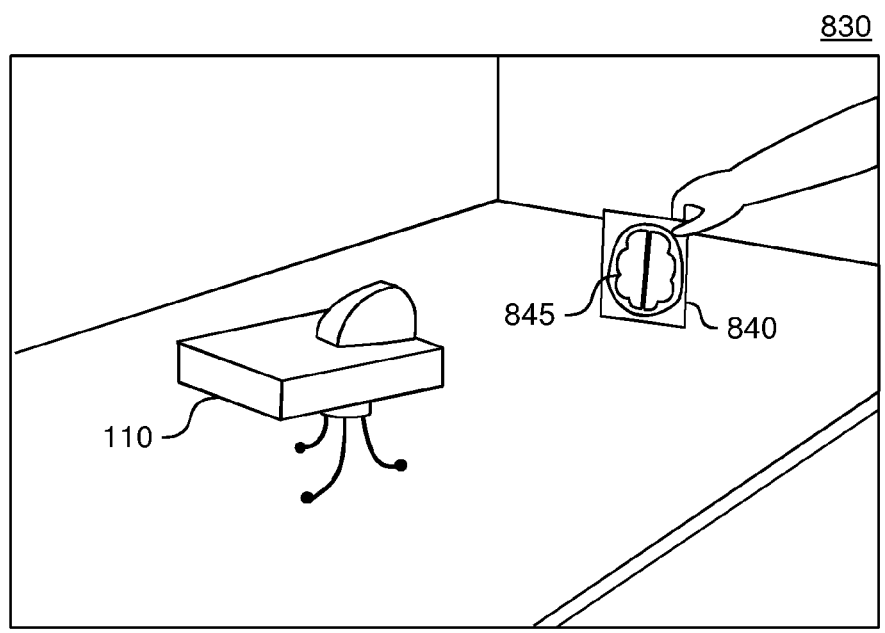

In one embodiment, the motion beam application 248 is configured to display slices of a three-dimensional (3D) image, based on the determined distance between the mobile device 110 and the display surface 710. An example of this is shown in FIGS. 8A-B, which illustrates an example of projecting slices of a three-dimensional image from a mobile device that includes a handheld projection system, according to one embodiment disclosed herein. For purposes of this example, assume that the projected images are slices of a 3D MRI image. As shown in FIG. 8A, the scene 800 includes the mobile device 110, a display surface at a first position 810 and a first projected image 815. Here, assume that the display surface includes an embedded marker (e.g., using an infrared ink) that is detected by a camera (e.g., an infrared camera) of the display device 110. Additionally, further assume that the motion beam application 248 is preconfigured with dimensions information for the embedded marker and uses such information to estimate the distance between the display device 110 and the display surface.

In this example, as the user slides the display surface closer to the mobile device 110, the motion beam application 248 is configured to estimate the new distance between the device 110 and the display surface and to select a slice of the 3D MRI image to project onto the display surface. Thus, as shown in the scene 830 depicted in FIG. 8B, the display surface has been moved to a second position 840 and the display device 110 is now projecting a second, different image onto the display surface. Advantageously, doing so enables users (e.g., medical personnel) to view a 3D image in an intuitive and efficient way, and does so using unobtrusive and inexpensive embedded markers.

Figure 9A:
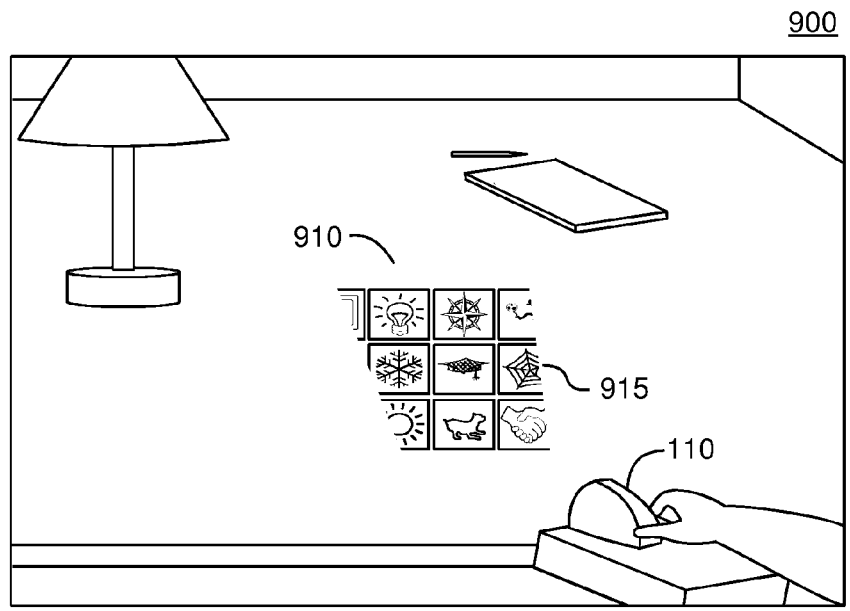
FIGS. 9A-B illustrate an example of projecting a content selection menu from a mobile device that includes a handheld projection system, according to one embodiment disclosed herein.
Figure 9B:
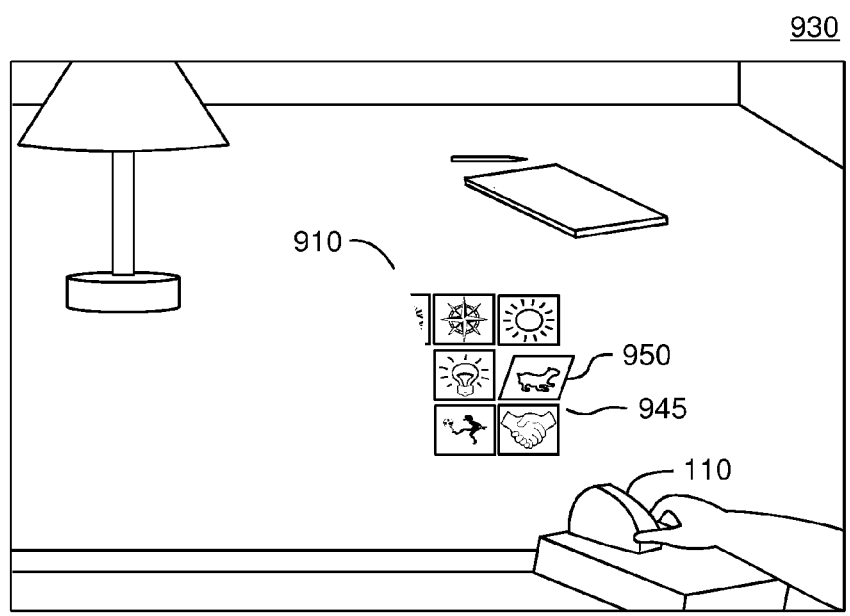

Additionally, the motion beam application 248 could be configured to identify content stored on the mobile device 110 and to project frames onto a display surface with an embedded marker, thereby allowing a user to browse and view the stored content. FIGS. 9A-B illustrate an example of projecting a content selection menu from a mobile device that includes a handheld projection system, according to one embodiment disclosed herein. As shown in FIG. 9A, the scene 900 depicts the mobile device 110 projecting an image 915 onto a display surface. Although not shown in the scene 900, assume that the display surface includes a hidden marker embedded therein (e.g., using an infrared ink).

Here, the mobile device 110 is projecting, onto the surface 910, an image 915 which depicts a content browser for content (e.g., image files, audio files, video files, applications, etc.) stored on the mobile device 110. In this example, the motion beam application 248 is configured to detect as the user moves the mobile device 110 relative to the embedded marker within the display surface 910, and to alter the projected frames accordingly. For instance, as the user moves the mobile device 110 across the display surface 110, the motion beam application 248 could adjust the projected frames to depict a selection of one of the content items based on the detected movement. An example of this is shown in FIG. 9B, where the user has rotated the mobile device 110 such that the mobile device 110 points more to the right relative to the mobile device 110 in scene 900. As such, the scene 930 shows the mobile device 110 projecting a second image 945 onto the display surface. Here, the second image 945 includes a selected content item 950. Similarly, if the user were to then rotate the mobile device 110 in an upwards direction relative to the position shown in scene 930, the content item above the selected content item 950 (i.e., the picture of the sun) could be shown as selected.

In such an embodiment, the user could then use an input device (e.g., a button, a touch screen, a microphone for detecting voice commands, etc.) of the mobile device 110 to select the selected content item 950. Upon detecting this input, the motion beam application 248 could project subsequent frames onto the display surface 910 which depict an enlarged version of the selected content item 950. Advantageously, doing so provides an intuitive and interactive way for users to browse content stored on the mobile device 110 (or content stored at another location accessible by the mobile device 110). Additionally, while the present example relates to browsing content items, it is broadly contemplated that embodiments can be used to navigate a variety of menus and other user interfaces consistent with the functionality described herein.

Figure 10:
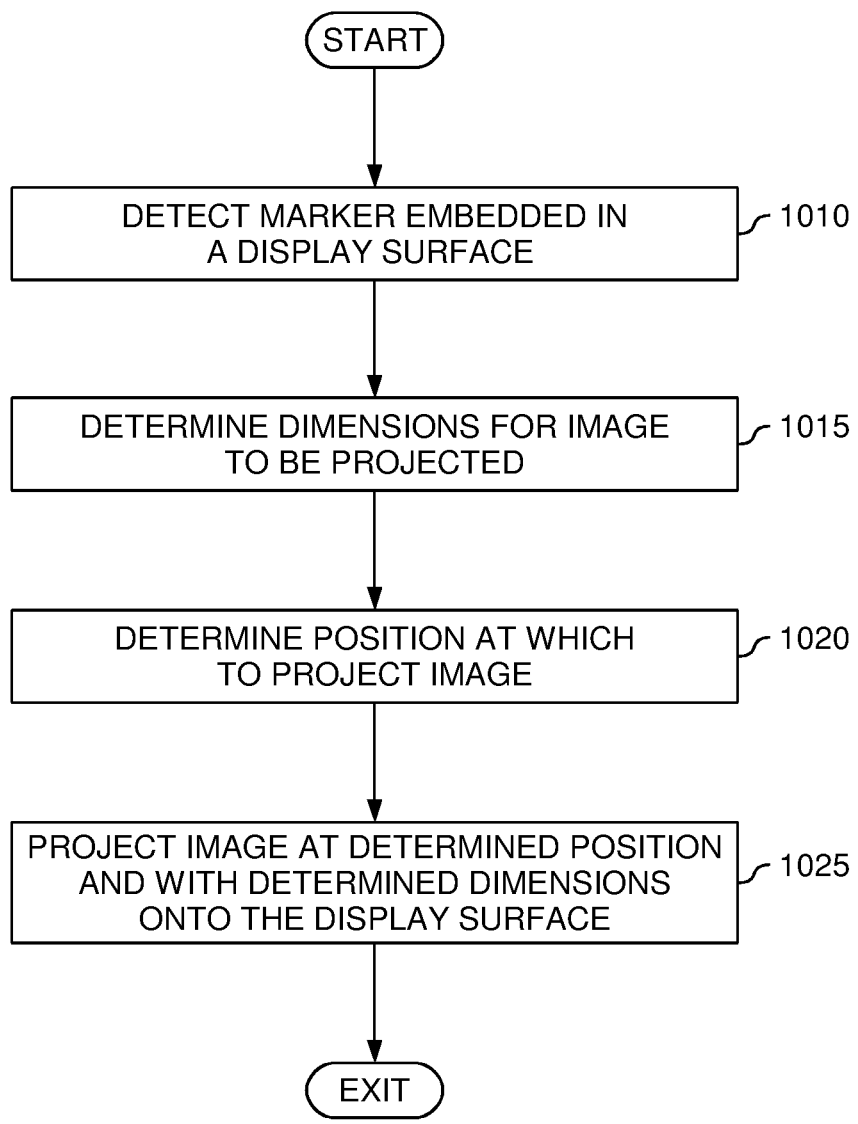
FIG. 10 illustrates a method for projecting images onto a surface based on a marker embedded in the surface, according to one embodiment disclosed herein.

FIG. 10 illustrates a method for projecting images onto a surface based on a marker embedded in the surface, according to one embodiment disclosed herein. As shown, the method 1000 begins at block 1010, where the motion beam application 248 detects a marker embedded in a display surface. Generally, the marker may be embedded in such a way that it is difficult to see with the human eye, but is readily detectable by the mobile device 110. For example, in one embodiment, the marker is embedded in the display surface using an infrared ink, and the mobile device 110 is equipped with an infrared camera capable of detecting the marker. Additionally, the display surface may also contain other visual markers or designs in addition to the embedded marker. For instance, the display surface could contain a hidden marker embedded using an infrared ink, but could also be printed with a picture that is easily visible to the human eye.

Additionally, the motion beam application 248 determines the dimensions for an image to be projected onto the display surface (block 1015). For example, the motion beam application 248 could be preconfigured with dimensions information for the embedded marker and could use the dimensions information to estimate a distance between the mobile device 110 and the display surface. The motion beam application 248 could then alter the size of the projected image based on the determined distance, such that the projected image will always appear as having the same physical dimensions regardless of the distance between the mobile device 110 and the display surface. Additionally, the motion beam application 248 determines a position on the display surface at which to project the image relative to the position of the embedded marker (block 1020). For instance, in one embodiment, the motion beam application 248 could be configured to project an image onto the embedded marker itself. By doing so, embodiments may use the projected image to cover up the embedded marker, thereby helping to hide the embedded marker from view by the human eye. In another embodiment, the motion beam application 248 could be configured to project the image onto the display surface up to a predetermined distance away from the embedded marker.

The motion beam application 248 then projects the image (e.g., using the projection unit 225) onto the display surface at the determined position and with the determined dimensions (block 1025), and the method 100 ends. As an example, one embodiment could include two cards, one with a first embedded marker that is hidden from the human eye (e.g., using an infrared ink) and printed with a picture of a trampoline that is readily visible to the human eye, and the second card with a second embedded marker that is hidden from the human eye and printed with a picture of a wall that is readily visible to the human eye. In such an embodiment, the display device 110 could project frames that depict an animated character that walks across the display surface. The motion beam application 248 could detect the first and second embedded markers and could determine when the projected character encounters one of these markers. The motion beam application 248 could then alter the actions of the projected character, based on the marker that the character encountered.

For example, if the motion beam application 248 determines the projected character has encountered the trampoline card, the motion beam application 248 could alter the behavior of the character to depict the character jumping on the trampoline in subsequent projected frames. As another example, if the motion beam application 248 determines that the projected character has encountered the wall card, the motion beam application 248 could alter the behavior of the character such that the character turns around and begins walking the other direction. Doing so enables the motion beam application 248 to detect objects within the physical environment and to alter the projected images accordingly. Additionally, embodiments accomplish this using embedded markers that are hidden from the user's view and thus do not disrupt the aesthetics of the display surface. Moreover, such a hidden embedded marker may be detected by the mobile device, regardless of the appearance of the display surface to the human eye. Thus, continuing the above example, the user could be provided with the trampoline card and the wall card that originally appear as blank white cards to the human eye, and the user could be instructed to draw a trampoline on the first card and to draw a wall on the second card. The motion beam application 248 could then alter the projected images so that the animated characters appear to respond to the user's drawings. Advantageously, doing so provides a fun and more immersive experience for the user.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for presenting display frames projected using a handheld projector, the method comprising:
   detecting a marker embedded in a display surface;
   projecting a first display frame from the handheld projector, wherein the first display frame projects, on the display surface, one or more animated objects positioned relative to the detected marker embedded in the display surface; and
   generating one or more subsequent display frames projected from the handheld projector, wherein at least a first one of the animated objects in the one or more subsequent display frames is positioned relative to the detected marker embedded in the display surface.

2. The method of claim 1, wherein the marker is embedded in the display surface using at least one of an infrared-absorbing material and an infrared-emitting material.

3. The method of claim 2, wherein detecting a marker embedded in the display surface is performed using an infrared camera.

4. The method of claim 2, wherein the display surface further includes a visible design embedded using a second material that is visible to the human eye.

5. The method of claim 1, further comprising:
   determining a current position of the handheld projector within a physical environment; and
   adjusting the display frames based on the determined current position of the handheld projector.

6. The method of claim 1, wherein the handheld projector is integrated with a mobile device that includes at least a processor, a memory and an application program, which when executed on the processor, determines a position relative to the marker embedded within the display surface at which to project the display frames.

7. The method of claim 6, further comprising:
   identifying one or more instances of content stored on the mobile device,
   wherein the first display frame and the one or more subsequent display frames depict at least an indication of the one or more instances of content.

8. The method of claim 1, wherein the first display frame projected from the handheld projector depicts a first two-dimensional (2D) slice of a three-dimensional (3D) image divided into a plurality of 2D slices, wherein the first 2D slice is selected based on a first determined distance between the handheld projector and the display surface, wherein the one or more subsequent display frames depict a second 2D slice of the 3d image, and wherein at least one of the one or more subsequent display frames is selected based on a second determined distance between the handheld projector and the display surface.

9. A handheld device, comprising:
   a processor;
   a projector; and
   a memory containing a program that, when executed on the processor, performs an operation for presenting display frames using the projector, the operation comprising:
   detecting a marker embedded in a display surface;
   projecting a first display frame from the handheld projector, wherein the first display frame projects, on the display surface, one or more animated objects positioned relative to the detected marker embedded in the display surface; and
   generating one or more subsequent display frames projected from the handheld projector, wherein at least a first one of the animated objects in the one or more subsequent display frames is positioned relative to the detected marker embedded in the display surface.

10. The handheld device of claim 9, wherein the marker is embedded in the display surface using at least one of an infrared-absorbing material and an infrared-emitting material.

11. The handheld device of claim 10, wherein detecting a marker embedded in the display surface is performed using an infrared camera.

12. The handheld device of claim 10, wherein the display surface further includes a visible design embedded using a second material that is visible to the human eye.

13. The handheld device of claim 9, the operation further comprising:
    determining a current position of the handheld projector within a physical environment; and
    adjusting the display frames based on the determined current position of the handheld projector.

14. The handheld device of claim 9, the operation further comprising:
    determining a position relative to the marker embedded within the display surface at which to project the display frames.

15. The handheld device of claim 14, the operation further comprising:
    identifying one or more instances of content stored on the handheld device,
    wherein the first display frame and the one or more subsequent display frames depict at least an indication of the one or more instances of content.

16. The handheld device of claim 9, wherein the first display frame projected from the handheld projector depicts a first two-dimensional (2D) slice of a three-dimensional (3D) image divided into a plurality of 2D slices, wherein the first 2D slice is selected based on a first determined distance between the handheld projector and the display surface, wherein the one or more subsequent display frames depict a second 2D slice of the 3d image, and wherein at least one of the one or more subsequent display frames is selected based on a second determined distance between the handheld projector and the display surface.

17. A non-transitory computer-readable medium containing a program that, when executed, performs an operation for presenting display frames projected using a handheld projector, comprising:
    detecting a marker embedded in a display surface;
    projecting a first display frame from the handheld projector, wherein the first display frame projects, on the display surface, one or more animated objects positioned relative to the detected marker embedded in the display surface; and
    generating one or more subsequent display frames projected from the handheld projector, wherein at least a first one of the animated objects in the one or more subsequent display frames is positioned relative to the detected marker embedded in the display surface.

18. The non-transitory computer-readable medium of claim 17, wherein the marker is embedded in the display surface using at least one of an infrared-absorbing material and an infrared-emitting material.

19. The non-transitory computer-readable medium of claim 18, wherein detecting a marker embedded in the display surface is performed using an infrared camera.

20. The non-transitory computer-readable medium of claim 18, wherein the display surface further includes a visible design embedded using a second material that is visible to the human eye.

21. The non-transitory computer-readable medium of claim 17, the operation further comprising:
   determining a current position of the handheld projector within a physical environment; and
   adjusting the display frames based on the determined current position of the handheld projector.

22. The non-transitory computer-readable medium of claim 17, the operation further comprising:
   determining a position relative to the marker embedded within the display surface at which to project the display frames.

23. The non-transitory computer-readable medium of claim 22, the operation further comprising:
   identifying one or more instances of content stored on the mobile device,
   wherein the first display frame and the one or more subsequent display frames depict at least an indication of the one or more instances of content.

24. The non-transitory computer-readable medium of claim 17, wherein the first display frame projected from the handheld projector depicts a first two-dimensional (2D) slice of a three-dimensional (3D) image divided into a plurality of 2D slices, wherein the first 2D slice is selected based on a first determined distance between the handheld projector and the display surface, wherein the one or more subsequent display frames depict a second 2D slice of the 3d image, and wherein at least one of the one or more subsequent display frames is selected based on a second determined distance between the handheld projector and the display surface.

25. A system, comprising:
   a marker constructed using at least one of an infrared-absorbing material and an infrared-emitting material; and
   a projection unit configured with logic for presenting display frames, comprising:
      detecting the marker embedded in a display surface;
      projecting a first display frame onto the display surface, comprising one or more animated objects positioned relative to the detected marker embedded in the display surface; and
      generating one or more subsequent display frames, wherein at least a first one of the animated objects in the one or more subsequent display frames is positioned relative to the detected marker embedded in the display surface.

* * * * *